United States Patent [19]

Conaty

[11] 3,858,321

[45] Jan. 7, 1975

[54] CHAIN SAW CUTTER BAR AND ITS METHOD OF FABRICATION

[75] Inventor: Francis Henry Conaty, Torrance, Calif.

[73] Assignee: The McCulloch Corporation, Los Angeles, Calif.

[22] Filed: Aug. 22, 1973

[21] Appl. No.: 390,331

[52] U.S. Cl................. 30/383, 29/501, 29/504, 164/26, 164/114
[51] Int. Cl............................................. B26b 17/02
[58] Field of Search.......................... 30/381–387; 51/206 R, 206.4; 299/82; 164/25, 26, 34, 35, 36, 114; 29/501, 504

[56] References Cited
UNITED STATES PATENTS

| | | | |
|---|---|---|---|
| 1,781,098 | 11/1930 | Broderick et al. | 164/114 |
| 2,334,257 | 11/1943 | Egger et al. | 29/504 |
| 2,714,760 | 8/1955 | Boam et al. | 29/504 |
| 2,811,342 | 10/1957 | McCallum | 299/82 |
| 2,962,812 | 12/1960 | Gommel | 30/383 |
| 3,064,399 | 11/1962 | Anderson | 51/206.4 |
| 3,081,661 | 3/1963 | MacPherson | 51/206 X |
| 3,094,751 | 6/1963 | Horton | 164/36 |
| 3,336,970 | 8/1967 | Watts et al. | 164/25 X |
| 3,416,578 | 12/1968 | Irgens | 30/387 |
| 3,744,363 | 7/1973 | Espana et al. | 30/383 |

OTHER PUBLICATIONS

Brazing Manual, N.Y. American Welding Society, Inc., 1963, pgs. 215 and 277.

Primary Examiner—Donald G. Kelly
Assistant Examiner—K. J. Ramsey
Attorney, Agent, or Firm—Burns, Doane, Swecker & Mathis

[57] ABSTRACT

A method is disclosed of fabricating a chain saw cutter bar whereby a nose rail is precision cast from a hard facing material, a suitable brazing alloy is applied between the precision cast nose rail and a cutter bar main body portion, and the nose rail is brazed to the cutter bar main body portion.

A cutter bar is disclosed having a main body portion and a nose rail assembly, the nose rail assembly having a plurality of spaced apart and parallel nose rails each having an exterior peripheral edge and an alignment means along an inside edge thereof. Means are provided interlockingly aligning the nose rails with respect to the main body portion.

11 Claims, 6 Drawing Figures

Patented Jan. 7, 1975
3,858,321
2 Sheets-Sheet 1
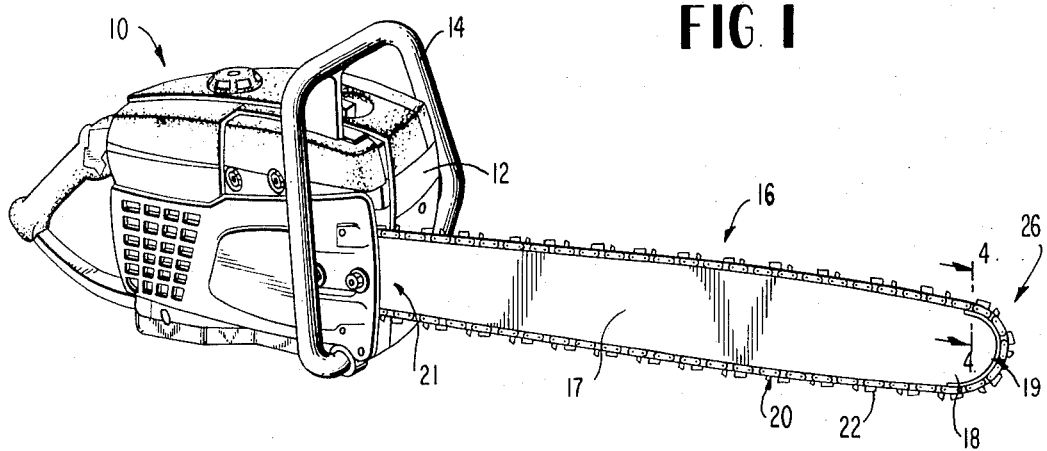
FIG. 1
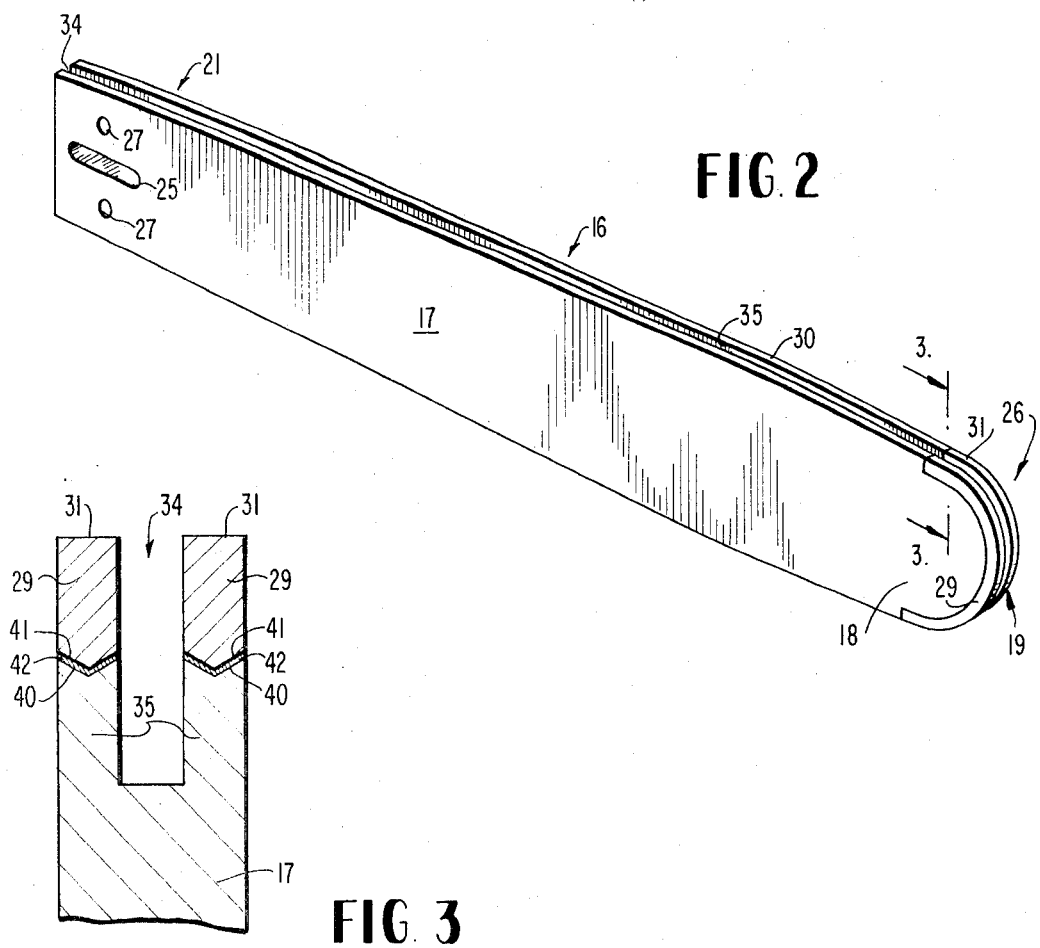
FIG. 2
FIG. 3

Patented Jan. 7, 1975

CHAIN SAW CUTTER BAR AND ITS METHOD OF FABRICATION

BACKGROUND OF THE INVENTION

This invention relates generally to cutter bars for chain saws. More particularly, this invention relates to a chain saw cutter bar and its method of fabrication wherein a nose rail assembly has been precision cast from a cobalt alloy and is brazed onto a grooved cutter bar main body portion.

Chain saws generally comprise four major components, namely, an endless saw chain to do the cutting, an elongated bar or arm to support the chain and around the edges of which the chain is constrained to travel, power means usually comprising a prime mover such as a gasoline engine or an electric motor, and means to drivingly connect the drive shaft of the power means with the saw chain. It is the elongated bar or arm to support the chain and around the edges of which the chain is constrained to travel to which the present invention is directed.

Chain saw cutter bars are conventionally provided with a peripherally extending groove which receives tongues provided on links of the saw chain to orient the chain in the plane of the cutter bar. In the operation of a conventional chain saw, the speed of travel of a saw chain along the elongated bar or arm is often between 2,000 and 4,000 feet per minute and is sometimes even higher. At the end or "nose" of the chain saw cutter bar remote from the power means or engine where the direction of the saw chain reverses itself, there may be excessive friction during the operation of the chain saw. This friction may cause the edges of the nose to heat up, significantly. In addition, this friction may cause a relatively high degree of wear at the nose of the cutter bar. If the edges along the nose of the chain saw cutter bar are not replaced with some particularly heat and wear resistant material, it is clear that after a relatively short period of operation of the chain saw, the bar can become substantially unfit for further use.

It has heretofore been proposed that a chain saw cutter bar be fabricated with a rail assembly of some hard facing material such as Stellite No. 1, 6, or 12 or the equivalent disposed about the nose portion of the cutter bar. ("Stellite" is a trademark for a series of cobalt-chromium-tungsten alloys. There are nine alloys available in the wear-resistant group.) Such a dense, hard facing material when positioned around the nose of the chain saw cutter bar, is sufficiently wear and heat resistant to withstand frictional action of the saw chain during operation.

It is a current practice to weld Stellite hard facing to the nose of the cutter bar. However, there are many variables in welding practices which make it extremely difficult to consistently maintain quality in the finished cutter bar without excessive rework after the hard facing has been added. This rework may involve grinding away a portion of the relatively expensive Stellite hard facing to achieve proper dimensional accuracy with a result that a significant portion of the hard facing applied to the cutter bar may be lost in subsequent finishing operations required to fabricate a conventional cutter bar. Moreover, the additional labor and material required by this rework can significantly increase the unit cost of producing a chain saw cutter bar and, hence, may increase the overall manufacturing costs of the chain saw.

In addition, during the welding of the nose rail to the cutter bar, numerous defects may be introduced by variations in the welding rod. Also, there can be a dilution of the hard facing by the iron in the cutter bar. In addition, thermal cracking may occur due to the welding and grinding stresses imposed on the conventionally fabricated cutter bar.

Recognizing the need for an improved nose rail assembly for such a chain saw cutter bar and its method of fabrication, it would, therefore, be desirable to provide a nose rail assembly which would substantially reduce metal variations and iron dilution in the cutter bar and reduce the loss of relatively costly Stellite from grinding operations.

OBJECTS

It is, therefore, a general object of the present invention to provide a novel chain saw cutter bar and method of fabrication which minimizes or reduces the problems of the type previously noted.

It is a more particular object of the present invention to substantially eliminate metal variations in the nose portion of a chain saw cutter bar which may occur during fabrication.

It is also an object of the present invention to provide a chain saw cutter bar nose rail assembly having improved dimensional precision.

It is, likewise, an object of the present invention to provide a novel method to reduce iron dilution and the loss of hard facing during the fabrication of a chain saw cutter bar.

Also, an object of the present invention is to provide a method which may eliminate up to 50 percent of the rework required in the fabrication of a chain saw cutter bar with a resulting more consistent product at a lower manufacturing cost.

SUMMARY OF A PREFERRED FORM OF THE INVENTION

A chain saw cuttr bar and a method of fabrication according to a preferred form of the invention intended to accomplish at least some of the foregoing objects includes molding a plurality of plastic patterns of nose rails for a chain saw cutter bar. These patterns are assembled in a stack or "tree" having a central longitudinal portion, and radial portions between the longitudinal portion and the patterns. This stack of plastic patterns is then encapsulated with at least a shell of refractory material which is permitted to harden. Heat is applied to the shell of refractory material in an amount sufficient to melt and vaporize the plastic patterns of the nose rail. As a result of melting and vaporizing the plastic patterns, there is formed a cavity within the refractory material. The volume previously occupied by the longitudinal portion of the plastic stack becomes available for use as a common passageway of the cavity, and the radial portions provide fluid communication between this common passageway and each of the cavities previously occupied by the patterns of the nose rails.

Further heating is applied to the shell of refractory material to raise the temperature to approximately 2,000° F to cure the shell and to minimize chill during casting. The shell or mold may be placed on a vacuum plate and subjected to a vacuum. This vacuum plate may comprise on asbestos pad which functions as a seal to molten metal but which permits a vacuum to be pulled therethrough by means of a conventional pump or similar apparatus. To effectuate a partial vacuum in the mold to assist pouring, a suitable top or cover could be placed over the mold, and molten metal could be introduced through this top and into the mold in a conventional manner.

Alternatively, the heated shell or mold may be placed in a rotatable container in such a manner that when the container is rotated, the shell rotates about the axis of the longitudinal passage of the shell. In any event, a molten metal (such as Stellite) is poured into the common passageway in an amount sufficient to fill the voids previously occupied by the plastic patterns. Where the vacuum assist technique is utilized, a partial vacuum lowers the pressure in the mold to help assure that each pattern cavity is completely filled in order to achieve fine detail and dimensional accuracy. Similarly, the centrifugal casting technique may be used to achieve substantially the same detail and dimensional accuracy.

The temperature of the molten metal is lowered to below its melting point to cast the chain saw nose rails. The now cast rails are knocked out of the mold and are removed from the "flashing" formed by the metal cast in the radial passages of the shell. A metal brazing alloy is applied which is suitable to bond the cast nose rails to the chain saw cutter bar main body portion by brazing. The nose rail is thereafter bonded to a V-groove on the cutter bar main body portion by induction brazing.

Through this method there is formed a novel chain saw cutter bar having a cutter bar main body portion and a nose rail assembly. The nose rail assembly is comprised of a pair of generally semi-circular nose rails each having an outer peripheral edge and at least one side wall portion adapted to withstand the friction of a saw chain coming into contact therewith during operation. A V-shaped projection extends along an inside radius of each of the nose rails. This V-shaped projection cooperates with the V-groove at the nose end of the cutter bar main body portion in order to facilitate and maintain alignment.

BRIEF DESCRIPTION OF THE DRAWINGS

Other objects and advantages of the present invention will become apparent with reference to the following detailed description of a preferred embodiment thereof in connection with the accompanying drawings, wherein like reference numerals have been applied to like elements, in which:

FIG. 1 is a perspective view of a chain saw having a nose rail according to the present invention;

FIG. 2 is a perspective view of the cutter bar of the chain saw of FIG. 1;

FIG. 3 is a cross-sectional view taken along the line 3—3 in FIG. 2;

DETAILED DESCRIPTION OF A PREFERRED EMBODIMENT OF THE INVENTION

Figure 4:
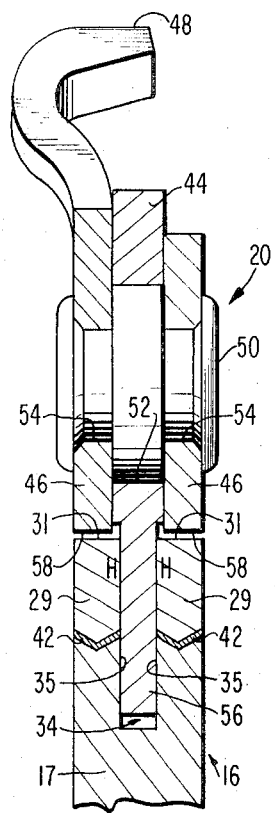
FIG. 4 is a cross-sectional view taken along the line 4—4 in FIG. 1.

Turning first to FIG. 1, there is shown a portable chain saw 10 including a motor housing 12, a carrying handle 14, a cutter bar 16 having a nose portion 18, and a chain 20. The cutter bar 16 is comprised essentially of a main body portion 17 and a nose rail assembly 19.

The cutter bar 16 is connected at its proximal end or heel portion 21 to the motor housing or frame 12. The chain 20, which carries a plurality of cutter elements 22, is mounted for sliding movement through a peripheral slot or groove 34 (FIG. 2) formed in an outer periphery of the cutter bar 16. The chain 20 is driven by a sprocket (not shown) mounted in the housing 12 and is powered by a motor (also not shown) contained within this housing.

At the distal end 26 of the cutter bar 16 there is affixed the nose rail assembly 19. The nose rail assembly 19 is comprised of two separate nose rails 29 both of which are fabricated from a wear and heat resistant material such as Stellite.

It will, however, be appreciated that a variety of wear and heat resistant materials exist which would be appropriate for use in such a nose rail assembly.

During operation of the chain saw 10, the distal end 26 of the chain saw cutter bar 16 is subjected to rather extreme thermal stresses. As the direction of movement of the saw chain 20 reverses itself, excessive friction is generated which may cause the end edges of the nose 18 of the cutter bar 16 to heat up at times to a red hot condition and to incur an unacceptable degree of wear. Hence, the Stellite nose rail assembly 19 provides a hard facing material at the nose 18 of the cutter bar 16, which material is sufficiently wear and heat resistent to withstand the high temperature and frictional contact occurring during operation of the chain saw 10.

With reference now to FIG. 2, there can be seen in somewhat greater detail the cutter bar 16 of the chain saw 10 of FIG. 1. The proximal end 21 of the cutter bar 16 may be provided with a slot 25 and apertures 27 for attaching the cutter bar 16 to the engine frame or housing 12 in a conventional manner. The nose rail assembly 19 is connected to the cutter bar main body portion 17 in such a manner that a peripheral edge 30 of the cutter bar main body portion 17 is contiguous with an exterior peripheral edge 31 of the nose rail assembly 19. That is to say, a chain 20 traveling through a peripheral chain receiving slot 34 defined by a pair of upstanding wall portions 35 will incur no interruption as it passes over the nose rail assembly 19.

The nose rail of the present invention is depicted herein as a semi-circle. It will, of course, be appreciated that a nose rail of greater or lesser or varying arcuate dimensional may be constructed in accordance with the present invention.

In FIG. 3 there can be seen a cross section of a portion of the distal end 26 of the cutter bar 16. It can be seen that the nose rail assembly 19 is comprised of two separate nose rails 29, fabricated from hard facing. These nose rails 29 are disposed in a parallel and spaced apart relationship and comprise a radial outer portion of the upstanding wall portions 35 which, as noted above, define the peripheral chain receiving slot 34. In the illustrated embodiment of the present invention, the Stellite nose rail assembly 19 comprises approximately one-half the depth of the peripheral chain receiving slot 34, but there is no intention to so limit the present invention.

A V-groove 40 in the nose 18 of the cutter bar main body portion 17 and a corresponding V-shaped projection 41 along an inside peripheral edge of the nose rail 39 constitute means for maintaining the nose rails 29 in assembled, parallel relationship, and means for interlockingly aligning each of the nose rails 29 with respect to the main body portion 17, particularly with the peripheral edge 30. In the assembly of the cutter bar 16, a metal alloy paste 42 is utilized to braze the nose rail assembly 19 to the cutter bar main body portion 17. Whereas various metal alloy pastes may be employed in the bonding of the nose rail to the cutter bar, a 1,850°F nickel alloy paste has been found to be satisfactory.

FIG. 4 is similar to FIG. 3 except that the saw chain 20 is shown in a position relative to cutter bar 16 corresponding to actual operation of the chain saw. The conventional saw chain 20 comprises center links 44 and side links 46. Some of the links 44, 46 carry cutters 48. The cutter 48 may be on the center links 44 or the side links 46. It will be appreciated that the chain employs a plurality of such cutters trained about the chain.

The side links 46 are conventionally connected to the center links 44 by pintles 50 which extend through pintle openings 52 in the center links 44 and relatively smaller openings 54 in the side links 46.

Each center link 44 has an extension or tongue 56 which runs in the bar groove or slot 34. When the chain saw 10 is operated the tongue 56 may be subjected to sidewise forces as the saw chain 20 reverses direction around the nose portion 18 of the cutter bar 16 which tend to increase the frictional contact between the sides of the tongue 56 and the upstanding wall portion 35 in such a manner that localized heating occurs in a zone at an upper end of upstanding wall portion 35 indicated generally by H. Because of the rather high speed of travel of the saw chain 20, the frictional contact between the upstanding wall portion 35 and the chain 20 may be of a sufficient amount to cause a chain saw cutter bar not having a hard facing nose rail assembly to heat up to a red hot condition and to incur an unacceptable degree of wear at the zone H. Hence, it is this zone H which contains the hard facing material Stellite from which the nose rail assembly 19 is fabricated. A significant portion of this heat in zone H may be produced by friction generated along the exterior peripheral edge 31 of the nose rail 29 as a result of a bottom portion 58 of the side links coming into frictional contact with the nose rail 29.

Figure 5:
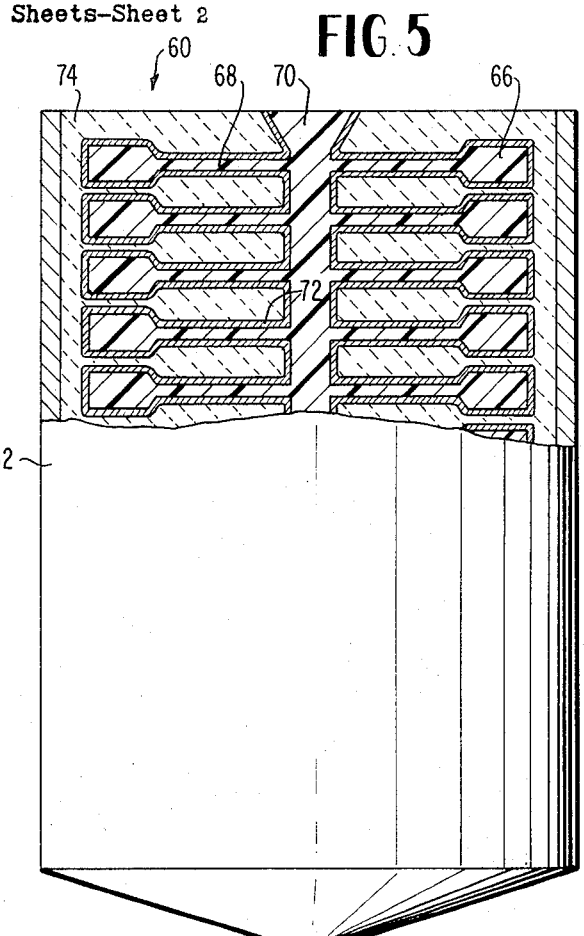
FIG. 5 is a partial sectional view showing a mold assembly suitable for centrifugally casting of the nose rail of the present invention.

In FIG. 5 there is schematically shown a mold 60 suitable for carrying out the fabrication of the nose rail 29 of the present invention by a centrifugal casting process. As noted above, the fabrication of the nose rail 29 may, in the alternative, comprise a vacuum assisted pouring technique. Because of the high degree of accuracy and detail achieved with both of these casting techniques, processes of this type are often referred to as "precision casting." It will be apparent that the design of the mold may be varied somewhat to suit dimensional requirements without departing from the essential features of the method herein disclosed.

Returning now to the centrifugal casting process, the mold assembly 60 comprises a heat resistant casing 62 mounted for rotation about the axis of a shaft 64. This shaft 64 is connected to a means which may be any conventional apparatus (not shown) which would be appropriate for imparting rotation to the casing 62.

In order to fabricate a nose rail according to the present invention, plastic patterns 66 are initially injection molded from a polyvinyl plastic or other suitable material by any suitable means. Whereas it is possible to cast nose rails singly by the method of the present invention, as will be readily understood, for the purposes of econony and efficiency and uniformity, it is preferred to cast the nose rails multiply or in gangs. The method described herein below is particularly adaptable to multiple casting.

Figure 6:
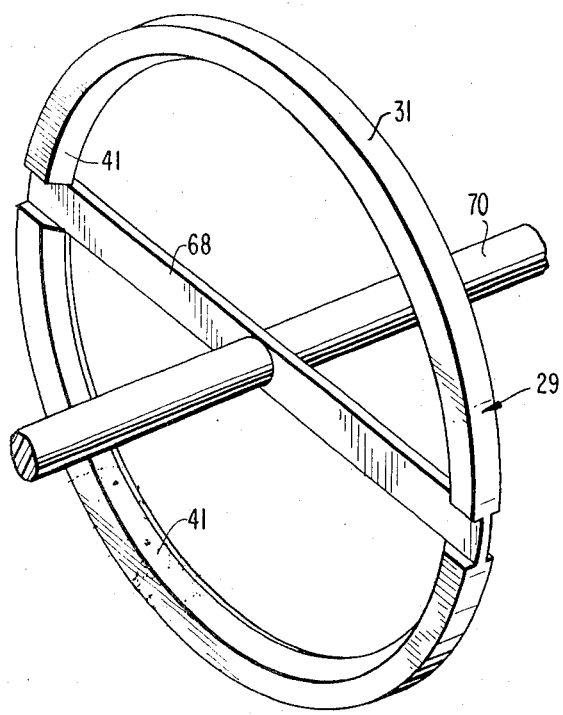
FIG. 6 is a perspective view of a "flashing," center sprue, and the nose rail of the present invention after having been centrifugally cast and "knocked out" of the mold of FIG. 5.

As will become apparent below, the plastic patterns 66 substantially correspond to the already cast nose rails 29 shown in FIG. 6. That is, the plastic patterns of the nose rail are generally semi-circular and have an exterior peripheral edge corresponding to peripheral edge 31 of the cast nose rail 29. (See FIG. 6) Similarly there is a V-shaped projection along an interior edge of the pattern corresponding to edge 41 of the cast nose rail and a corresponding "flashing" 68 and center sprue 70. (See FIG. 6) The plastic patterns 66 may be arranged in a conventional manner in a stacked and spaced apart relationship to form a "tree assembly" as shown in FIG. 5.

In a conventional manner the tree assembly is then invested with a refractory slurry to form a shell 72. The slurry may comprise a conventional suspension of refractory powder, such as zirconium silicate and fused silica in a binder solution comprised mainly of colloidal silical sol and small amounts of an organic film former, a wetting agent, and a defoaming agent. After the application of this initial refractory material, a suitable stuccoing material 74 may be applied which may include conventional components such as granular zirconium silicate, fused silica, various alumina grogs including mullite, sillimanite, fused alumina, tabular alumina, and similar materials.

Following the formation of the refractory shell, the plastic pattern assembly comprising the tree is removed from the mold by melting and then vaporizing the plastic through the application of heat in any known manner. After the plastic pattern assembly is removed, there remains a mold having cavities in the zones previously occupied by the plastic. A center passageway now exists in the volume previously occupied by the center sprue of the plastic pattern, and radial passages now exist in the zone the plastic pattern flashing previously occupied. These radial passages place the center passageway in flud communication with the mold for the nose rails.

Following the elimination of the plastic pattern assembly from the refractory shell, the mold or shell is heated to preferably approximately 2,000°F. This heating at an elevated temperature "sets" or cures the mold to make it suitable for casting metal and further melts away any possible remaining plastic pattern material. Moreover, the step of preheating prior to casting tends to minimize chill during casting.

The heated ceramic mold may now be rotated in the steel spinner 62 at about 75 G's. Alternatively, the heated mold may be placed on a vacuum plate (not shown) and subjected in conventional manner to a vacuum of about 20 inches of mercury. It will be appreciated that a suitable cover or top (not shown) having an appropriate inlet for molten metal may be placed over the mold in the practice of the vacuum assisted pouring technique.

The Stellite to be cast may be induction melted and is poured into the central passageway 70. The molten metal is distributed outwardly as a result of centrifugal forces or vacuum and passes through the radial passages formed by the flashings 68 of the plastic patterns. It will be appreciated that the molten metal in the radial passages and in the central passageway is constantly being subjected to centrifugal action or vacuum, and metal is constantly being urged into the mold cavity previously occupied by pattern 66. Consequently, the molten metal in the mold cavity is subjected to pressure from both the metal in the radial passages and the metal in the vertical passageway, with the result that the casting produced is normally clean, free of oxides, and is very dense. Any gases or air that may be in the mold cavity and in the vertical passage prior to the filling of the mold cavity are readily expelled by the metal through the vertical passageway or the vacuum.

The temperature of the molten Stellite is then reduced in order to form the casting. When the casting has reached an appropriately low temperature, the refractory mold is broken apart and the casting is removed. The nose rails 29 may then be severed from the flashing 68 in any suitable manner.

It has been found that precision cast nose rails fabricated in this manner have an extremely smooth surface requiring substantially no finishing machining. Moreover, the castings have been found to be substantially free of oxides and dirt.

The nose rail thus cast is substantially semi-circular in shape to correspond to the substantially semi-circular shape of the distal end 26 of the cutter bar main body portion 17 and has an exterior peripheral edge 31. There is a V-shaped projection 41 along the inside radius of the nose rail 29 which provides a means for positioning the nose rail assembly 19 in complementary relationship to the cutter bar main body portion 17 in order to provide a smooth path of travel for the saw chain 20. Whereas other arrangements than a V-shaped projection could be used to help align the nose rail assembly, it has been found that the V-shaped projection greatly facilitates the assembly of the cutter bar 16.

It is preferred in the practice of this invention that a 1,850° nickel alloy braze 42 be utilized to affix the nose rails 29 to the cutter bar main body portion 17. A nickel alloy brazing powder may be applied between the nose rail 29 and the cutter bar main body portion 17 along the V-groove, and induction bonding may be used to effectuate the assembly. It will be noted that the nose rail assembly 19 is comprised essentially of two nose rails 29 bonded to the nose portion of the cutter bar main body portion. In the assembly of a cutter bar according to the present invention, the grinding steps required in the fabrication of conventional cutter bars may be eliminated.

SUMMARY OF ADVANTAGES

It will be appreciated that in fabricating a chain saw cutter bar having a nose rail according to the present invention, certain significant advantages are provided.

In particular, the precision casting of the nose rail assembly makes it possible to consistently maintain quality in the cutter bar nose rail portion without excessive rework after affixing a hard facing material. The defects which may occur in the nose portion of the cutter bar during conventional assembly procedures utilizing conventional nose rails are substantially eliminated. For example, when the nose rail is conventionally welded to the cutter bar, the defects, which may be caused by variations in the material of the welding rod, or dilution of the hard facing by the iron in the bar, or thermal cracking due to welding and grinding stresses during finishing and rework of the cutter bar nose portion will be substantially eliminated in accordance with the present invention.

A cutter bar fabricated according to the present invention substantially eliminates the loss of expensive Stellite in conventional cutter bars as a result of grinding operations subsequent to welding a nose rail to the cutter bar portion. In addition, reduction in rework and finishing will result in a cutter bar (and chain saw) having a substantially lower manufacturing cost.

Thus, it is apparent that there has been provided, in accordance with the invention, a nose rail for a chain saw cutter bar that substantially satisfies the objects and advantages set forth above. Although the present invention has been described in conjunction with specific embodiments thereof, it is evident that many alternatives, modifications, and variations will be apparent to those skilled in the art in light of the foregoing disclosure of the invention. Accordingly, it is intended that all such alternatives, modifications, and variations which fall within the spirit and scope of the invention as defined in the appended claims be embraced thereby.

What is claimed is:

1. A method of fabricating a chain saw cutter bar, said method comprising the steps of:
   molding a plurality of plastic patterns of a nose rail portion for a chain saw cutter bar;
   assembling the plurality of plastic chain saw nose rail patterns in a stack to form a tree arrangement having a nose rail pattern portion, a flashing portion, and a center sprue portion;
   encapsulating the tree arrangement with a shell of refractory material to thereby form a mold around the plastic patterns;
   applying heat to the mold of refractory material sufficient to melt and vaporize the plastic patterns of the chain saw nose rail to form communicating cavities corresponding to the nose rail pattern portion, the flashing portion, and the center sprue portion;
   precision casting a nose rail portion of a chain saw from a molten metal suitable to form a hard facing;
   knocking out from the mold the now cast nose rails, flashing, and center sprue;
   severing the nose rails from the flashing portion of the casting;
   applying a metal brazing powder, suitable to bond the precision cast nose rails to the cutter bar main body portion, to a V-groove therebetween and brazing the nose rails to the cutter bar main body portion to thereby form a chain saw cutter bar.

2. The method of fabricating a chain saw cutter bar of claim 1 wherein said precision casting step comprises:
   subjecting the mold to a partial vacuum suitable to draw the molten metal into the mold to thereby fill the cavities previously occupied by the plastic pattern.

3. The method of fabricating a chain saw cutter bar of claim 1 wherein said precision casting step comprises:
   introducing the mold into a rotatable container;
   rotating the rotatable container about a longitudinal axis of the cavity previously occupied by the center sprue portion; and
   pouring a molten metal into the cavity corresponding to the center sprue portion in an amount sufficient to thereby fill the cavities previously occupied by the plastic patterns.

4. The method of fabricating a chain saw cutter bar of claim 1 wherein the pattern is injection molded from a polyvinyl plastic.

5. The method of fabricating a chain saw cutter bar of claim 1 wherein said molten metal is comprised of Stellite.

6. The method of fabricating a chain saw cutter bar of claim 1 wherein said metal brazing powder is comprised of a nickel alloy.

7. A method of fabricating a chain saw cutter bar comprising the steps of:
   precision casting a nose rail from a material suitable to form a wear resistant hard facing;
   applying a metal brazing alloy, suitable to bond the precision cast nose rail to a chain saw cutter bar main body portion, between the nose rail and the cutter bar main body portion; and
   brazing the cast nose rail to the cutter bar main body portion to thereby form a chain saw cutter bar.

8. The method of fabricating a chain saw cutter bar of claim 7 wherein said step of precision casting includes centrifugally casting the nose rail from a material comprising Stellite.

9. The method of fabricating a chain saw cutter bar of claim 7 wherein said step of precision casting includes the nose rail from a material comprising Stellite.

10. The method of fabricating a chain saw cutter bar of claim 7 wherein the metal paste comprises a 1,850°F nickel alloy paste.

11. A cutter bar assembly in combination with a chain saw having a manually portable housing, an engine in said housing, an endless cutter chain entrained about said cutter assembly in driven relationship with said engine; said cutter bar assembly being mounted to said housing and projecting outwardly therefrom and comprising:
   a cutter bar main body portion having:
      a first pair of spaced outer peripheral edges,
      a slot located between said outer peripheral edges receiving guide tongues of said cutter chain, and
      a pair of curved nose portions at a distal end of said cutter bar main body portion;
      said curved nose portions having spaced outer peripheral edges that are stepped inwardly relative to said first outer peripheral edges;
   a nose rail assembly at said distal end of said cutter bar main body and comprising a pair of precision cast, wear-resistant nose rails secured to said curved nose portions in spaced parallel relationship, said nose rails being fabricated by the steps of:
      molding a plurality of plastic patterns of a nose rail in a stack to form a tree arrangement having a center sprue pattern portion, a series of nose rail pattern units spaced longitudinally along said sprue pattern portion, and vertically spaced flashing pattern portions connecting said center sprue pattern portion with said nose rail pattern units;
      each of said nose rail pattern units comprising a pair of arcuate nose rail patterns circumferentially spaced by outer ends of an associated flashing pattern portion,
   encapsulating said tree arrangement with a shell of refractory material to form a mold around the plattic patterns,
   applying heat to the mold of refractory material sufficient to melt and vaporize said plastic patterns so as to form communicating cavities corresponding to said nose rail patterns, said flashing pattern portions, and said center sprue pattern portions,
   introducing a molten cobalt-chromium metal alloy into said cavities while facilitating entry of said molten metal alloy into said cavities by one of the steps of:
      rotating said mold, and
      applying a partial vacuum to said mold,
   knocking out from said mold a precision cast metallic nose rail tree assembly comprising a center sprue portion, a series of nose rail units spaced longitudinally along said sprue portion, and vertically spaced flashing portions connecting said nose rail units with said center sprue portion;
      said nose rail units each comprising a pair of arcuate nose rails circumferentially spaced by outer ends of an associated flashing portion, and
   severing said nose rails from said flashing portions;
   said precision cast nose rails each including a V-shaped projection along an inner peripheral edge thereof;
   said outer peripheral edge of each of said curved nose portions including a V-shaped groove dimensioned to receive said V-shaped projection;
   said nose rails being connected to said curved nose portions solely by interposing a layer of nickel alloy brazing paste between said V-projected inner peripheral edge of said nose rail and said V-grooved outer peripheral edge of said curved nose portion;
   said brazed nose rails being oriented on said curved nose portions such that:
      each of said nose rails including an outer peripheral edge that is contiguous with a respective one of said first outer peripheral edges of said cutter bar main body portion,
      the sides of said nose rails are substantially flush with the sides of said curved nose portions; and
      the brazed connection between said nose rails and their associated curved nose portions comprising V-shaped brazing layers which together form a W-shaped brazing connection constituting the sole connection between said nose rail assembly and said cutter bar main body portion.

* * * * *